Patented June 18, 1935

2,005,296

UNITED STATES PATENT OFFICE 2,005,296

METHOD OF PURIFYING NATURAL HEAVY SPAR

Johannes Müller and Manfred Müller, Homberg-on-the-Lower-Rhine, Germany, assignor to the firm Sachtleben Aktiengesellschaft für Bergbau und Chemische Industrie, Cologne-on-the-Rhine, Germany, a German company No Drawing. Application February 17, 1934, Serial No. 711,818. In Germany March 6, 1933

19 Claims. (Cl. 23—122)

Our invention relates to the purification of natural heavy spar by calcining and quenching the spar.

As described in the U. S. Patent 1,923,497, lump spar is calcined under reducing conditions at 1300–1350° C., the quantity of carbonaceous reducing substance present being so determined that a small percentage of the heavy spar or barium sulphate is reduced to barium sulphide. The charge is then quenched in water or dilute solutions containing sulphide, and the small percentage of barium sulphide immediately converts the impurities of the spar, chiefly metal oxides, into metal sulphides which are then removed by simply washing out with water.

According to the present invention, instead of quenching the charge in water, or dilute solutions containing sulphides, we quench it in a dilute aqueous solution of a mineral acid, with or without addition of an alkali salt of a mineral acid. We may also use a quenching liquid which is obtained by mixing solutions of several mineral acids, with or without addition of their alkali salts.

We have found that by using such a solution, or solutions, for quenching the charge, pure white heavy spar is obtained by washing out for a short time, without any other operations, so that the method is much simplified.

It has already been proposed to purify calcined heavy spar by means of acids. For instance, it has been proposed to calcine heavy spar under oxidizing conditions, to quench the charge, and to dissolve the metal oxides which have formed, by acids. It has also been proposed to break up, and to preliminarily purify, heavy spar by calcination, and to admix concentrated acid with the hot charge so as to transform it into paste, and the impurities in the spar are converted, by prolonged reaction, into a condition in which they are soluble and can be washed out.

Our novel method is distinguished in principle from the abovesaid old methods in that by quenching the calcined charge in a solution, or solutions, of mineral acid with or without addition of alkali salt, as described above, pure white heavy spar is obtained immediately, i. e., without any other operations.

As compared with the method of the said prior patent, our novel method is distinguished in that the acid washing which is performed after the quenching, in order to remove the last traces of impurities, is performed in a single operation, the action of the acid in the quenching liquid being instantaneous.

Suitable quenching liquids are, for instance, dilute aqueous solutions of hydrochloric acid, with or without addition of sulphuric acid, nitric acid, or free sulphur dioxide, and solutions of sulphuric acid to which preferably are added salts, such as sodium chloride, sodium nitrate, sodium sulphite, sodium bisulphite, etc.

Our novel method will be better understood from the following examples.

In all examples, the charge contains 1000 kilogrammes of crude heavy spar which may be powdered or lumpy, and contains 93 to 96% of $BaSO_4$, and 3 to 6% of $SiO_2$ (silicic acid or quartz), or silicic acid in combination with alkaline earths, metal oxides, etc., about 1% of the metal oxides being coloring oxides. The charge is calcined as described in the said prior patent.

Example I 10.0 kg. of crude heavy spar are calcined, the hot charge is quenched in 300 to 400 litres of a 10% solution of sodium chloride to which the equivalent amount of sulphuric acid has been added, and the impurities are removed by washing with water.

Example II 1000 kg. of crude heavy spar are calcined, the hot charge is quenched in 300 to 400 litres of a 10% solution of sodium chloride which contains 1% of sodium nitrate, with respect to the spar, and to which has been added the equivalent amount of sulphuric acid, plus an excess of 5%, and the impurities are removed by washing with water.

Example III 1000 kg. of crude heavy spar are calcined, the hot charge is quenched in 300 to 400 litres of a 10% solution of sodium chloride which contains 1% of sodium sulphite, or sodium bisulphite, with respect to the spar, and to which has been added the equivalent amount of sulphuric acid, plus an excess of 5%, and the impurities are removed by washing with water.

Example IV 1000 kg. of crude heavy spar are calcined, the hot charge is quenched in 300 to 400 litres of 5 to 8% hydrochloric acid (5% of hydrochloric acid with respect to the spar), the dissolved metallic impurities and the colloidally dissolved silicic acid are removed by washing with water, and the spar is worked up in the usual way.

Example V 1000 kg. of crude heavy spar are calcined, the hot charge is quenched in 300 to 400 litres of 5 to 8% hydrochloric acid to which has been added sulphuric acid at the rate of 2% with respect to the spar, and the impurities are removed by washing with water.

Example VI 1000 kg. of crude heavy spar are calcined, the hot charge is quenched in 300 to 400 litres of 5 to 8% hydrochloric acid, to which have been added nitric acid at the rate of 1% with respect to the spar, and sulphuric acid at the rate of 2% with respect to the spar, and the impurities are removed by washing with water.

Example VII 1000 kg. of crude heavy spar are calcined, the hot charge is quenched in 300 to 400 litres of 5 to 8% hydrochloric acid to which have been added free gaseous sulphur dioxide at the rate of 1% $SO_2$ gas with respect to the spar, and sulphuric acid at the rate of 2% with respect to the spar, and the impurities are removed by washing with water.

We claim:

1. The method of purifying natural heavy spar, comprising calcining spar under reducing conditions at 1300 to 1350° C., whereby small amounts of barium sulphide are produced, and quenching the charge in a mineral acid.

2. The method of purifying natural heavy spar, comprising calcining spar under reducing conditions at 1300 to 1350° C., whereby small amounts of barium sulphide are produced, and quenching the charge in a liquid containing mineral acid.

3. The method of purifying natural heavy spar, comprising calcining spar under reducing conditions at 1300 to 1350° C., whereby small amounts of barium sulphide are produced, and quenching the charge in a mixture of mineral acids.

4. The method of purifying natural heavy spar, comprising calcining spar under reducing conditions at 1300 to 1350° C., whereby small amounts of barium sulphide are produced, and quenching the charge in a dilute solution of mineral acid.

5. The method of purifying natural heavy spar, comprising calcining spar under reducing conditions at 1300 to 1350° C., whereby small amounts of barium sulphide are produced, and quenching the charge in a dilute aqueous solution of mineral acid.

6. The method of purifying natural heavy spar, comprising calcining spar under reducing conditions at 1300 to 1350° C., whereby small amounts of barium sulphide are produced, and quenching the charge in dilute solutions of mineral acids.

7. The method of purifying natural heavy spar, comprising calcining spar under reducing conditions at 1300 to 1350° C., whereby small amounts of barium sulphide are produced, and quenching the charge in a dilute solution of hydrochloric, nitric, and sulphuric acid.

8. The method of purifying natural heavy spar, comprising calcining spar under reducing conditions at 1300 to 1350° C., whereby small amounts of barium sulphide are produced, and quenching the charge in a dilute solution of hydrochloric and nitric acid, and of sulphur dioxide.

9. The method of purifying natural heavy spar, comprising calcining spar under reducing conditions at 1300 to 1350° C., whereby small amounts of barium sulphide are produced, and quenching the charge in a liquid consisting of a dilute solution of mineral acid and a dilute solution of alkali salt of mineral acid.

10. The method of purifying natural heavy spar, comprising calcining spar under reducing conditions at 1300 to 1350° C., whereby small amounts of barium sulphide are produced, and quenching the charge in a liquid consisting of a dilute aqueous solution of mineral acid and a dilute aqueous solution of alkali salt of mineral acid.

11. The method of purifying natural heavy spar, comprising calcining spar under reducing conditions at 1300 to 1350° C., whereby small amounts of barium sulphide are produced, and quenching the charge in a liquid consisting of a dilute solution of at least one substance selected from the group consisting of hydrochloric acid, sulphuric acid, nitric acid, sulphurous acid, sodium chloride, sodium nitrate, sodium sulphite, and sodium bisulphite.

12. The method of purifying natural heavy spar, comprising calcining spar under reducing conditions at 1300 to 1350° C., whereby small amounts of barium sulphide are produced, and quenching the charge in a dilute solution of mineral acid, with an addition of alkali salt of mineral acid.

13. The method of purifying natural heavy spar, comprising calcining spar under reducing conditions at 1300 to 1350° C., whereby small amounts of barium sulphide are produced, and quenching the charge in a dilute aqueous solution of mineral acid, with an addition of alkali salt of mineral acid.

14. The method of purifying natural heavy spar, comprising calcining spar under reducing conditions at 1300 to 1350° C., whereby small amounts of barium sulphide are produced, and quenching the charge in a dilute solution of mineral acid, with an addition of sodium chloride.

15. The method of purifying natural heavy spar, comprising calcining spar under reducing conditions at 1300 to 1350° C., whereby small amounts of barium sulphide are produced, and quenching the charge in a dilute solution of mineral acid, with an addition of sodium chloride and sodium nitrate.

16. The method of purifying natural heavy spar, comprising calcining spar under reducing conditions at 1300 to 1350° C., whereby small amounts of barium sulphide are produced, and quenching the charge in a dilute solution of mineral acid, with an addition of sodium sulphite.

17. The method of purifying natural heavy spar, comprising calcining spar under reducing conditions at 1300 to 1350° C., whereby small amounts of barium sulphide are produced, and quenching the charge in a dilute solution of mineral acid, with an addition of sodium bisulphite.

18. The method of purifying natural heavy spar, comprising calcining spar under reducing conditions, whereby small amounts of barium sulphide are produced, and quenching the charge in a mineral acid.

19. The method of purifying natural heavy spar, comprising calcining spar, and quenching the charge in a mineral acid.

JOHANNES MÜLLER.
MANFRED MÜLLER.